(12) United States Patent
Dantlgraber

(10) Patent No.: US 6,419,460 B1
(45) Date of Patent: Jul. 16, 2002

(54) DRIVING MECHANISM FOR A PUMP

(75) Inventor: Jorg Dantlgraber, Bunderepublik (DE)

(73) Assignee: Mannesmann Rexroth AG, Lohr/Main (DE)

( * ) Notice: Subject to any disclaimer, the term of this patent is extended or adjusted under 35 U.S.C. 154(b) by 0 days.

(21) Appl. No.: 09/554,893

(22) PCT Filed: Dec. 4, 1998

(86) PCT No.: PCT/DE98/03571
§ 371 (c)(1),
(2), (4) Date: Jun. 12, 2000

(87) PCT Pub. No.: WO99/34498
PCT Pub. Date: Jul. 8, 1999

(30) Foreign Application Priority Data

Dec. 23, 1997 (DE) .......................................... 197 57 728

(51) Int. Cl.⁷ ................................................ F04B 17/00
(52) U.S. Cl. ....................................... 417/366; 417/371
(58) Field of Search ............................... 417/371, 366, 417/373, 201, 423.8

(56) References Cited

U.S. PATENT DOCUMENTS

| | | | | |
|---|---|---|---|---|
| 4,834,624 A | * | 5/1989 | Jensen et al. ............... | 417/370 |
| 5,332,369 A | * | 7/1994 | Jensen ......................... | 417/369 |
| 5,857,841 A | * | 1/1999 | Kobayashi et al. .......... | 417/350 |

FOREIGN PATENT DOCUMENTS

| | | |
|---|---|---|
| DE | 36 42 724 A1 | 6/1988 |
| DE | 40 14 918 C2 | 11/1991 |
| DE | 41 20 665 A1 | 12/1992 |
| DE | 42 31 784 A1 | 3/1994 |
| DE | 196 52 706 A1 | 6/1997 |
| DE | 196 12 582 A1 | 10/1997 |
| DE | 196 35 411 A1 | 3/1998 |
| EP | 0661793 A1 * | 5/1995 |

* cited by examiner

Primary Examiner—Charles G. Freay
Assistant Examiner—William Rodriguez
(74) Attorney, Agent, or Firm—Oliff & Berridge PLC

(57) ABSTRACT

The present invention relates to a drive mechanism for a pump (10) implemented by means of a drive motor (20), the rotational speed and torque of which are influenced by a frequency converter (30). The frequency converter (30) is arranged on a heat dissipator (40) confining a flow of the pressure liquid guided to the pump (10). It is advantageous to also arrange the drive motor (20) inside the said heat dissipator (40), for this makes it possible to perform intense forced air cooling of a pump-drive motor system without the necessity of an additional cooling liquid. The drive motor (20) preferably has a central arrangement inside a tubular heat dissipator and is exposed to the pressure liquid over its entire circumference. Baffles or offset connecting sleeves allow for uniform flow through the entire heat dissipator (40).

19 Claims, 8 Drawing Sheets

DRIVING MECHANISM FOR A PUMP

BACKGROUND OF THE INVENTION

1. Field of Invention

The present invention relates to a drive mechanism for a pump, more specifically to a variable drive mechanism for a hydraulic pump.

2. Description of Related Art

From the prior art variable displacement pumps are known, wherein the displacement volume and the volume flow are mechanically adjustable. Vane-cell pumps and piston pumps are suited for adjustment in this way. These pumps only deliver a required amount of fluid, with adjustment being effected within the pump. It is, however, a disadvantageous effect that movable parts must be adjusted mechanically whereby accuracy is impaired, that orifices reducing the efficiency are used for volume flow control, and that the rotational speed is limited more narrowly than in the case of fixed displacement pumps.

In order to remedy these problems, polyphase machines are employed as a drive mechanism for a pump in the prior art, the input voltage and input frequency of which are variable by means of a frequency converter. The frequency converter may be physically separate from the polyphase machine or coupled to it by screw connection. Direct AC converters may be employed as frequency converters, whereby the motor winding is switched to different outer conductor voltages. It is, however, a drawback that the output frequency may only be adjusted in large steps, and that only frequencies below the mains frequency are possible.

These drawbacks are are eliminated in a frequency converter including an intermediary circuit. In such a link converter, the mains voltage is rectified to a direct voltage, smoothed, and applied to a DC-AC converter. At the output of the DC-AC converter, an alternating current having a different voltage and a different frequency is then available, which will then arrive in the polyphase machine. Polyphase machines preferred for economic reasons are the widely spread three-phase asynchronous machines. Such a motor features availability of a multiplicity of types and the fact that it does not require any startup aids.

Due to eddy currents and magnetic reversals in the magnetic material and due to the effect of the electrical current in the coil resistances of the above mentioned polyphase machines, heat is produced which limits the useful performance. In order to dissipate this heat, surface cooling is typically employed in the three-phase asynchronous machine, whereby ventilator losses are additionally incurred.

A fan-type air cooling which reduces the temperature at the surface is shown in FIG. 1. Herein a rotor 102 and the stator coil 101 on which heat is produced are located inside a housing 106. On the housing 106, radiator fins 105 are provided which expose the generated heat to air on a large surface. A fan 103 increases the flow velocity of the intake air and guides it past protection caps 104 across the radiator fins 105 where the air may adsorb the generated heat.

Inasmuch as the cooling medium used is a gas and is sufficiently available in the environment, surface cooling is an economically favorable manner of proceeding if cooling may take place independently of engine speed, the amount of heat to be dissipated does not exceed a certain limit, and air cleanness and humidity suffice specific minimum requirements.

At the frequency converter, too, energy is generated which cannot be transferred to the pump. Generatory energy is re-supplied into the mains in the case of very large drive mechanisms upwards of approximately 30 kW. In the case of drive mechanisms in the medium or lower performance range, a braking resistance is inserted in the intermediary circuit whenever the intermediary circuit voltage exceeds a particular value. At this braking resistance, the conversion of excessive energy into heat, which is transferred from the housing to the surrounding air, takes place.

SUMMARY OF THE INVENTION

It is the object of the present invention to optimise and efficiently execute cooling of a drive mechanism for a pump including a drive motor, wherein high compactness of the device is to be ensured.

Moreover in the present invention, the efficiency of a standard asynchronous motor is to be enhanced, and a large quantity of heat is to be dissipated from the standard asynchronous motor.

It is furthermore desired to reduce the airborne noise emission of a combination of drive motor and pump.

This object is attained through a drive mechanism for a pump including a drive motor in accordance with claim 1. Herein a frequency converter for actuation of a drive motor is mounted on a heat dissipator cooled by the hydraulic fluid to be conveyed by the pump. Thus, in the absence of an additional cooling medium, the temperature of the frequency converter may be reduced and its operation be designed to be more effective.

In a preferred manner, the heat dissipator is located at the suction port of the pump in order for the pressure and the volume flow at the pressure port of the pump to be at the desired values.

Even though more intense cooling of the drive motor might be desired or required, it is favorable to arrange this drive motor inside the heat dissipator in such a way that maximum enveloping flow takes place. In this way, the heat transfer from the drive motor to the pressure liquid thus also used as a cooling liquid may be optimised.

For the heat dissipator any tubular shape is well suited inasmuch as in this way the number of dead zones is minimised, and at the same time a uniform enveloping flow around the drive motor may take place in the heat dissipator. Moreover it is thereby also possible to favorably solve problems with respect to sealing of the heat dissipator.

When using a standard asynchronous motor, the A and B flanges may be fastened on both sides of the tubular main portion of the heat dissipator, so that the drive mechanism according to the present invention may be used on already existing drive motors in a simple manner. Preferably seals are introduced between between the cyclindrical portion of the motor and the respective flanges in order to isolate the inside of the motor from the cavity of the heat dissipator.

When the electrical connection between the drive motor and the frequency converter is routed through a flange lid, an impairment of the cable for electrical actuation of the drive motor due to the hydraulic flow in the heat dissipator is avoided.

A fan may be provided on a drive motor fan shaft externally of the heat dissipator in order to cause movement of air around the heat dissipator. Hereby the temperature of the pressure liquid supplied to the pump is reduced.

The port leading to the tank and the port leading to the pump are preferably located outside the mechanical connection between the flanges and the flange lids. Due to such an arrangement, mechanically stable installation of the drive motor into the heat dissipator is made possible, and a rapid movement of pressure liquid through the heat dissipator is equally permitted.

In order to avoid rectilinear, preferred flow paths in the heat dissipator, the ports in another embodiment of the present invention are offset with respect to the output shaft of the drive motor, i.e., they are formed in different relative positions on the flange lids. Uniform flow through all ranges of the heat dissipator is hereby achieved.

High compactness of the drive mechanism according to the present invention is ensured in the present invention through the fact that the front face-side lid of the drive motor is concurrently used as the sealing cover for the pump.

Preferably a fluid conduit connecting the space adjacent the drive motor with the suction port of the pump extends in the front face-side lid. Hereby an arrangement of conduits externally of the drive mechanism is avoided, and operational safety is enhanced.

In a preferred embodiment, the space adjacent the drive motor is the cavity in the heat dissipator, whereby a space-saving arrangement of pump, drive motor and frequency converter at concurrent efficient cooling of motor and frequency converter is made possible.

It is furthermore an advantage that the pump is an axial piston pump, and support means are provided at the front face-side lid as an abutment for the axial pistons. As a result of these support means, vibrations of the pump may be minimised because a design of the support means becomes possible which is conceived with a view to the mechanical properties only.

Radially outside of the support means, a housing comprised of sound-insulating material and fastened to the front face-side lid may be provided. As this housing is mechanically connected at only one end portion with the support means, preferably insulated against structure-borne noise, the acoustic emission of the pump is reduced.

In another preferred embodiment, the opposite end portions of the drive motor are secured to the heat dissipator through flange lids of flexible material. Such a structure further contributes to increased sound attenuation of the drive mechanism.

Further developments in accordance with the invention constitute the subject matters of the dependent claims.

BRIEF DESCRIPTION OF THE DRAWINGS

The invention shall now be described in detail by referring to the annexed drawings, wherein.

DETAILED DESCRIPTION OF PREFERRED EMBODIMENTS

Figure 2:
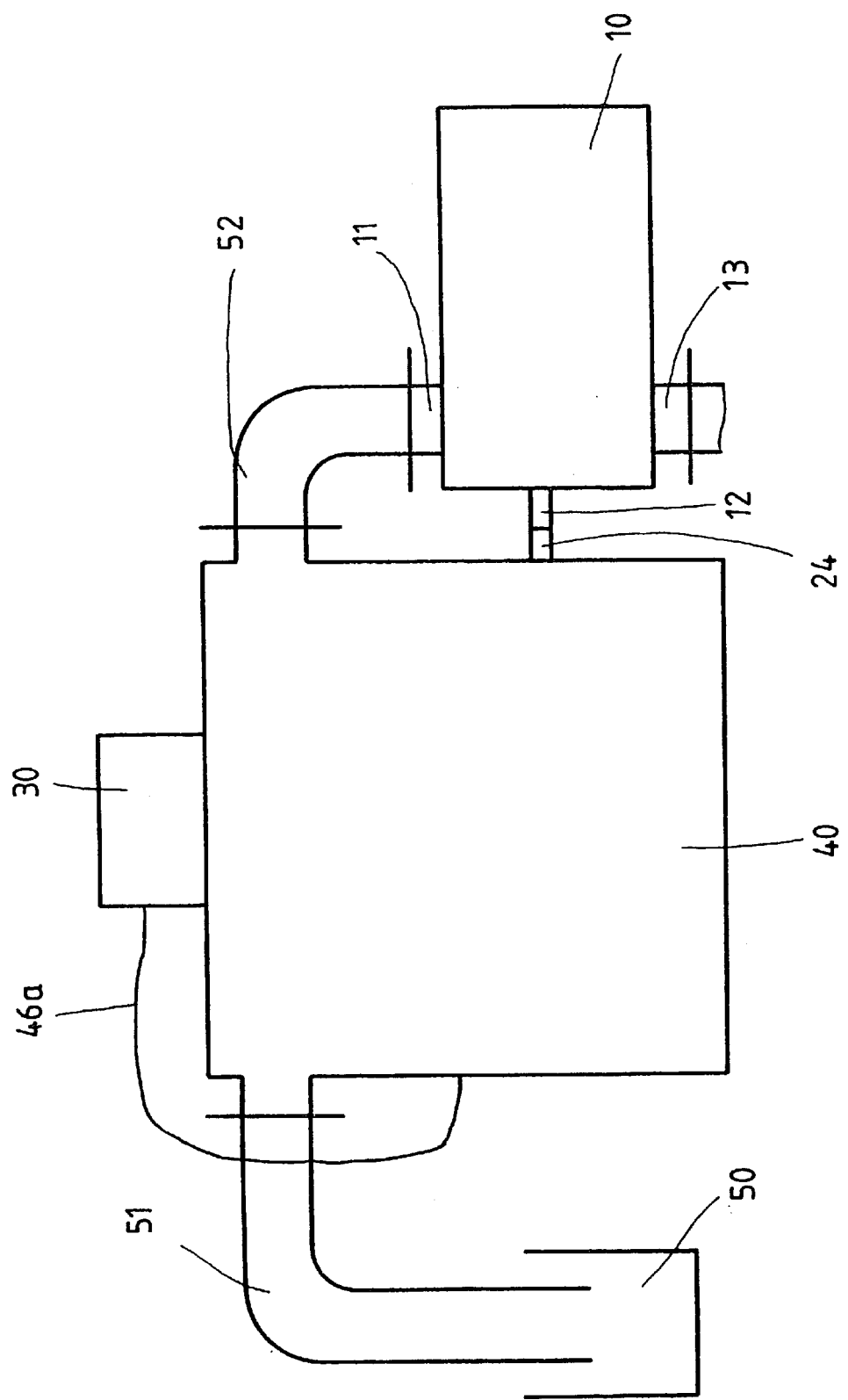
FIG. 2 is a schematic representation of a drive mechanism according to the invention and a driven pump when incorporated into a hydraulic circuit.

At the outset, the relevant portion of a hydraulic system including a drive mechanism according to the present invention is explained by referring to FIG. 2.

Inside a heat dissipator 40 a drive motor 20 is provided, the output shaft 24 of which is connected to the drive shaft 12 of a hydraulic pump 10. Moreover on the heat dissipator 40 a frequency converter 30 is located which provides a desired voltage and frequency at the drive motor 20 through a cable 46a. The rotational speed of the pump, and consequently the torque thereof, may thus be adjusted by suitably controlling the frequency converter 30.

Through a first conduit portion 51 the heat dissipator 40 is connected with a tank 50 through which a pressure medium, which may be oil, water, or some other fluid to be conveyed by the pump, is supplied. The tank 50 may be replaced with any hydraulic system supplying pressure liquid.

The pressure liquid from the heat dissipator 40 arrives via a second conduit portion 52 at the suction port 11 of the pump 10 through which the desired variation of the volume flow and pressure of the pressure liquid is performed.

As an alternative it is, however, also possible to directly connect the tank 50 to the suction port 11 of the pump 10 and to provide the heat dissipator 40 only downstream from a pressure port 13 of the pump 10. In this case, the heat dissipator 40 must be of a pressure-resistant design.

In the following, the structural component comprised of heat dissipator 40, drive motor 20, and frequency converter 30 shall be described in more detail by referring to FIG. 3.

Figure 1:
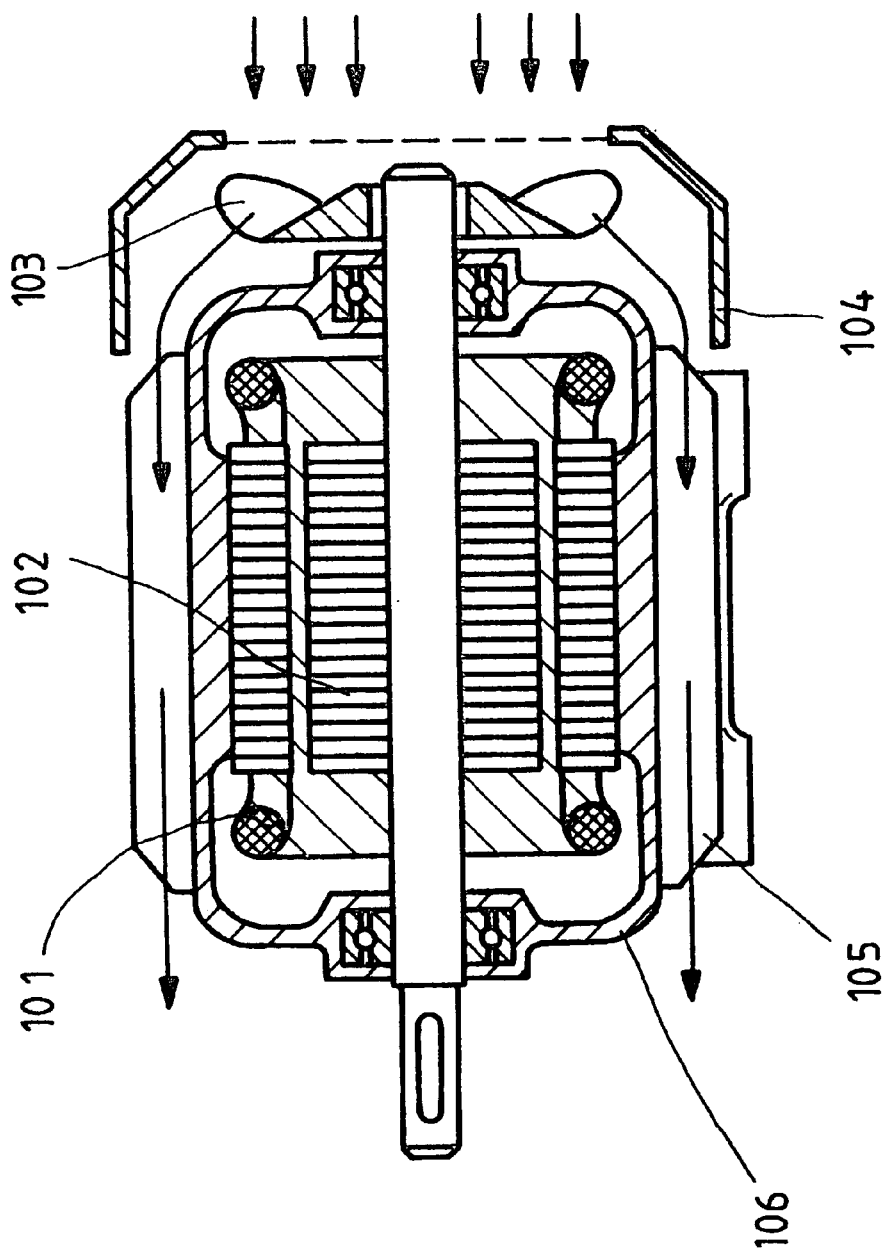
FIG. 1 represents a sectional view of a conventional three-phase asynchronous machine with surface cooling.

The drive motor 20 located in the heat dissipator 40 and preferably having the form of a standard asynchronous motor comprises a central cylindrical portion 21 on which radiator fins are provided. At the two front surface sides of this cylindrical portion 21, an A flange 22 and a B flange 23, respectively, are provided which close the front surface sides. The cyclindrical portion 21, the A flange 22 and the B flange 23 are known from the prior art. Thus the use of conventional standard asynchronous motors in the present invention is made possible, with the fan designated by reference numeral 103 in FIG. 1 having to be removed in FIG. 3.

In order to prevent the entrance of pressure liquid into the space between rotor and stator coil in the drive motor 20, peripheral seals 44, 45 are formed at the joints between the cyclindrical portion 21 and the A flange 22 and B flange 23, respectively.

Figure 3:
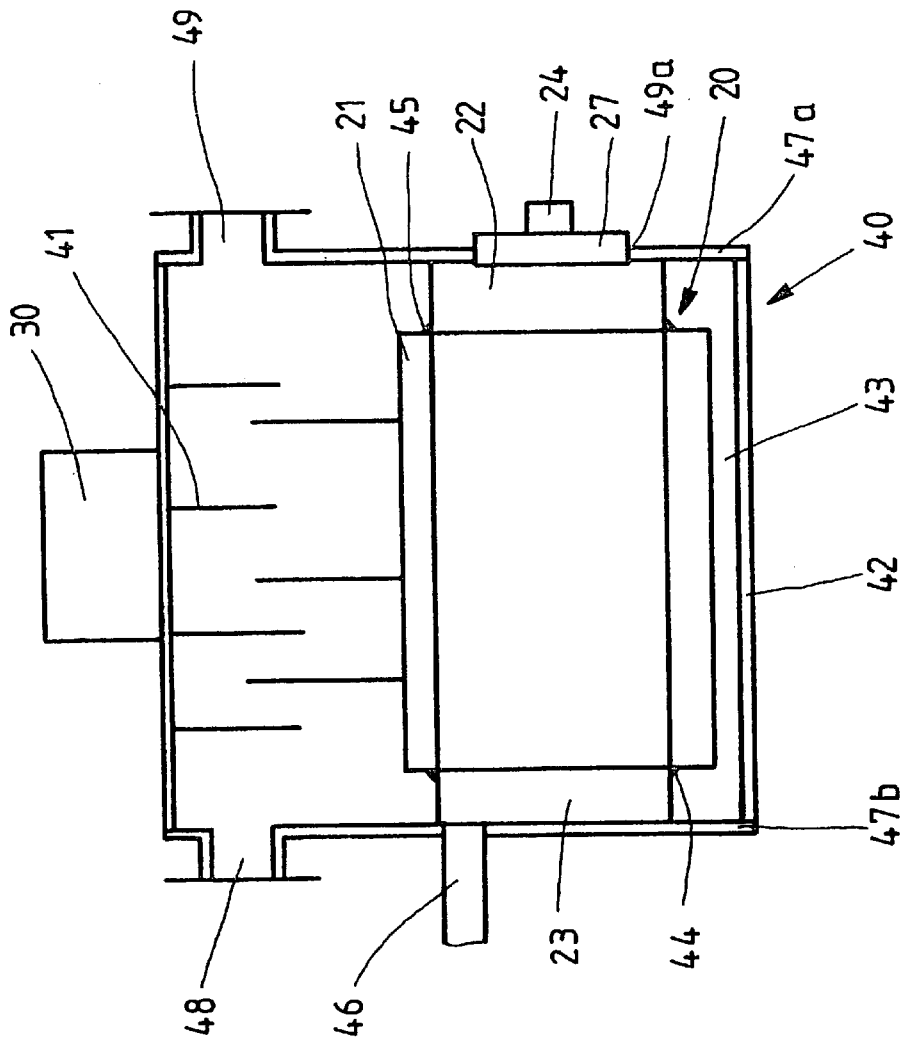
FIG. 3 shows a sectional view of the drive mechanism for a pump according to the present invention.
Figure 4:
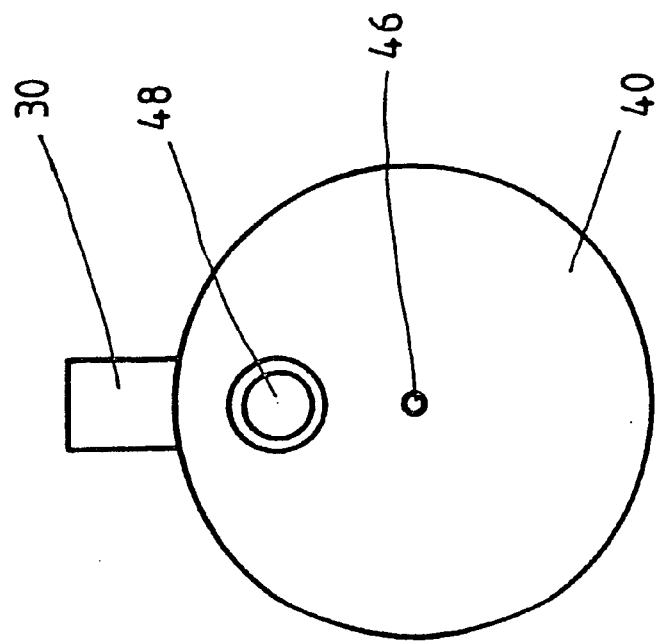
FIG. 4 shows the lateral view of the drive mechanism according to the invention of FIG. 3 when viewed from the left side.

In the first embodiment as shown in FIG. 3, the heat dissipator 40 includes a tubular portion 42 wherein the tube may have a circular cross-sectional shape as shown in FIG. 4, or any other angular, oval or ellipsoid shape. It is, however, necessary to ensure the inner diameter of the tubular portion 42 to be larger than the outer diameter of the cyclindrical portion 21 from the drive motor 20 including the radiator fins mounted there, so that the pressure liquid may cool the entire outer periphery of the drive motor 20.

At the axial end portions of the tubular portion 42 there are, as is shown in FIG. 3, flange lids 47a, 47b sealed against the tubular portion 42 and the A and B flanges (22, 23). At the flange lid 47b an inlet port 48 is arranged through which the pressure liquid enters into a cavity 43 of the heat dissipator 40 formed by the tubular portion 42 and the flange lids 47a, 47b. Moreover a cable connector 46 is provided in the flange lid 47b, whereby electrical connection between the drive motor 20 and a connection cable 46a to the frequency converter 30 is established. An outlet port 49 guiding the pressure liquid from the cavity 43 of the heat dissipator 40 is arranged at the flange lid 47a. In addition there is a circular opening 49a, the function of which is described below, in the flange lid 47a.

When the drive motor 20 is to be mounted in the heat dissipator 40, initially the B flange 23 of the drive motor 20 is fastened to the flange lid 47b in such a manner as to enable establishing an electrical connection to the frequency converter 30 via the cable connector 46a. Then the tubular portion 42 is fastened to the flange lid 47a in a fluid-tight manner. Subsequently a cyclindrical projection 27 is inserted at the A flange 22 of the drive motor 20 in the circular opening 49a in the flange lid 47a and sealed against it, with the flange lid 47b at the same time being set on the tubular portion 42 and sealed against it. As a result, the motor shaft 24 of the drive motor 20 protrudes from the heat dissipator 40 on the side of the flange lid 47a and may be connected with the pump drive shaft 12 in accordance with FIG. 2. As an alternative it is, however, also possible to arrange the heat dissipator 40 and the pump 10 at a greater distance than is shown in FIG. 2.

The frequency converter 30 is located on the periphery of the tubular portion 42 of the heat dissipator 40 while contacting the outer peripheral surface at portion 42 with a surface as large as possible.

Thus the frequency converter 30 is cooled by a flow of liquid from the inlet port 48 to the outlet port 49. Cooling of the entire outer peripheral surface of the drive motor 20 is also effected simultaneously with the aid of this flow of liquid.

In order to provide a uniform heat exchange in the entire cavity 43 of the heat dissipator 40, baffles 41 may be provided in the preferred embodiment of the invention between the inner peripheral wall at the tubular portion 42 and the outer peripheral wall of the cyclindrical portion 21 of the drive motor 20 including the radiator fins, as is schematically shown in FIG. 3.

Figure 5:
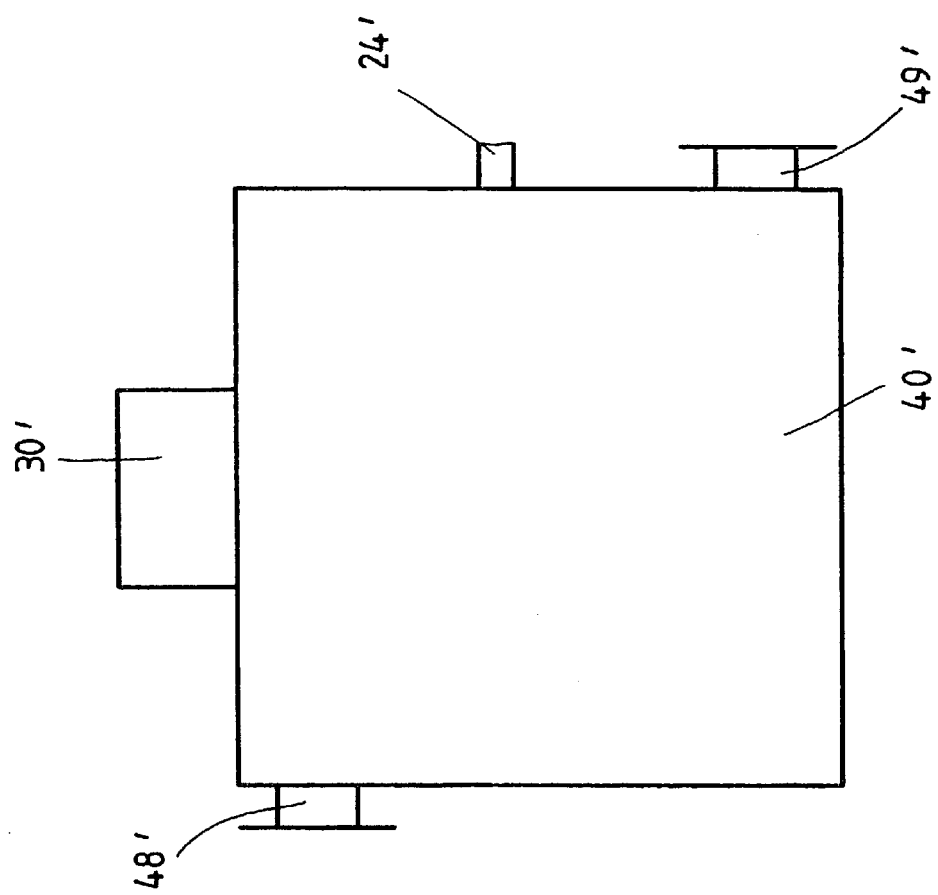
FIG. 5 represents a second embodiment of the drive mechanism according to the invention.

In the second embodiment of the present invention as shown in FIG. 5, the inlet port 48' and the outlet port 49' are offset with respect to each other in the radial direction of the tubular portion 42. Hereby both a uniform enveloping flow around the drive motor 20 and furthermore a sufficient heat exchange of the pressure liquid with the frequency converter 30 may be provided in the cavity 43 in the absence of any baffles.

Figure 6:
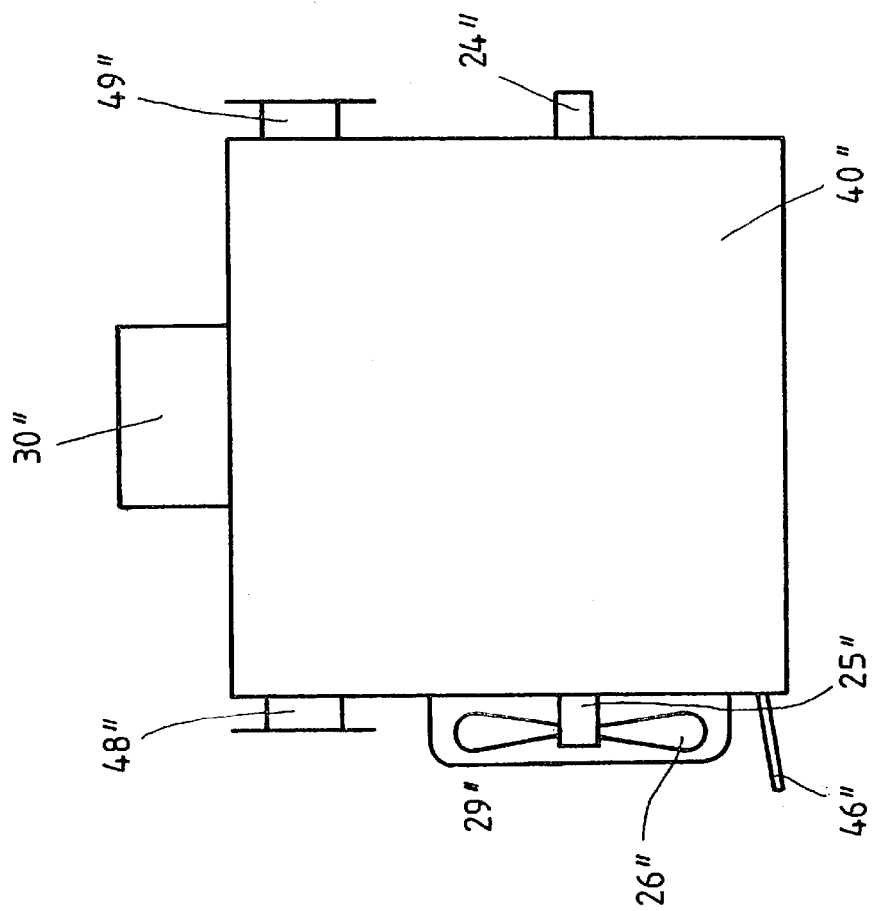
FIG. 6 shows a third embodiment of the drive mechanism according to the invention.

In accordance with the third embodiment of the present invention as shown in FIG. 6, a fan shaft 25" of the drive motor having a fan 26" fastened to it may extend through the flange lid at which the inlet port 48" is provided. This fan 26" brings about air circulation around the heat dissipator independently of rotational speed, whereby the outer wall of the heat dissipator 40 is cooled. As a result, the temperature of the pressure liquid entering the pump 10 is lowered. The fan 26" is preferably lined with an air-permeable protective cap 29" in order to prevent injury hazard while the fan 26" rotates. The cable 46" must in this case be arranged externally of the fan 26".

Figure 7:
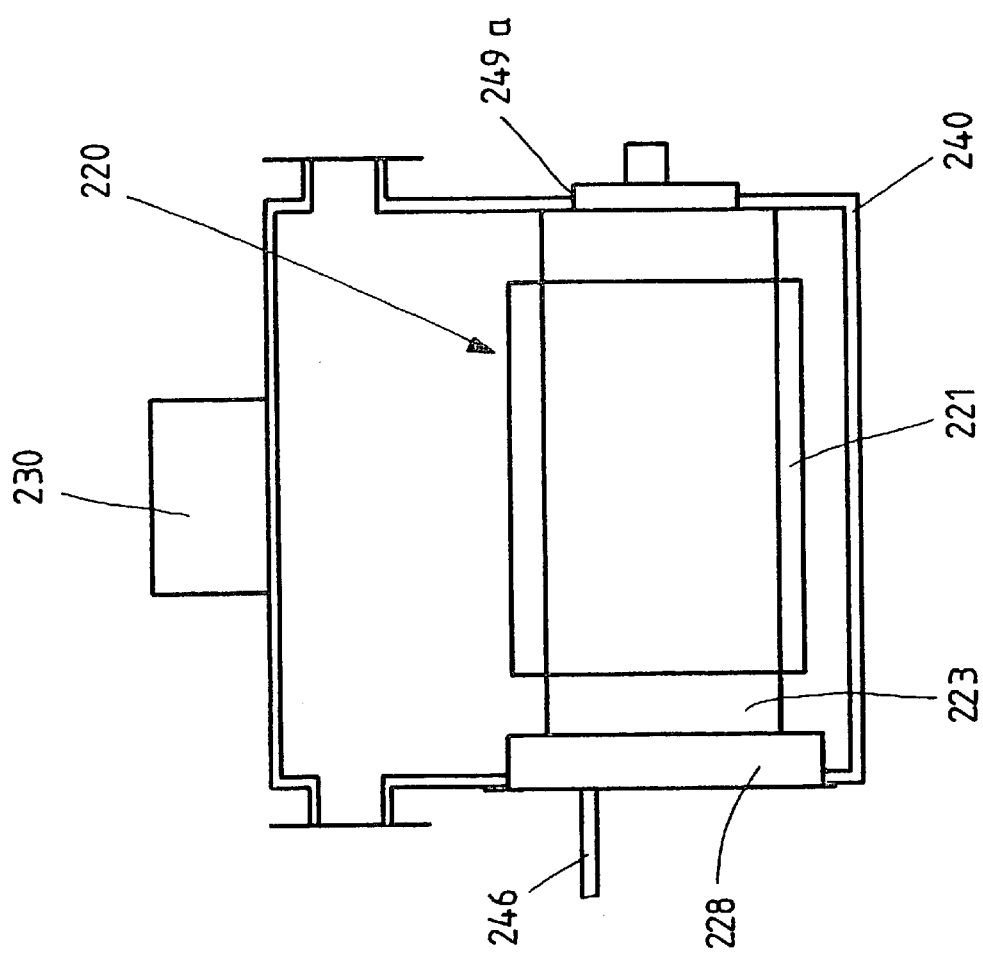
FIG. 7 shows a fourth embodiment of the drive mechanism according to the invention.

FIG. 7 shows a fourth embodiment of the present invention having a modified heat dissipator construction. The flange lids of the first embodiment are here incorporated into the heat dissipator 240. In order to allow for mounting of the drive motor 220 which may here also be a standard asynchronous motor, an insertion flange 228 having a greater outer diameter than the cyclindrical portion 221 of the drive motor 220 is fastened at the B flange 223 of the drive motor 220. In this insertion flange 228, the corresponding port for the cable 246 towards the frequency converter 230 is provided. Accordingly, during installation it is only necessary to insert the drive motor 220 in the circular opening 49a and mount the insertion flange 228 at the B flange 223. As a result, the number of joints on the heat dissipator 240 requiring to be sealed is reduced.

The embodiments shown in FIGS. 2 to 7 share the circumstance that the pressure liquid to be pumped cools both the frequency converter and the drive motor. Forced air cooling is thus implemented which is advantageous in comparison with fan-type air cooling in conventional asynchronous machines in terms of both cooling effect and effectivity, inasmuch as the pressure liquid is, in any case, pressurised through the pump. A further enhanced effectivity is made possible by the additional fan cooling in according with the third embodiment shown in FIG. 6.

It is an additional advantage in the embodiments of FIGS. 2 to 7 that axial forces transmitted by the pump to the drive motor are attenuated by the pressure liquid in the vicinity of the drive motor. Here an attenuation of airborne noise emission by an additional 6 dB may be achieved.

Cooling in the drive mechanisms for pumps in accordance with FIGS. 2 to 5 and FIG. 7 moreover takes place independently of environmental air. Thus efficient cooling is also possible in a case where the air is highly polluted or humid, whereby the drive motor including a fan would be attacked.

Figure 8:
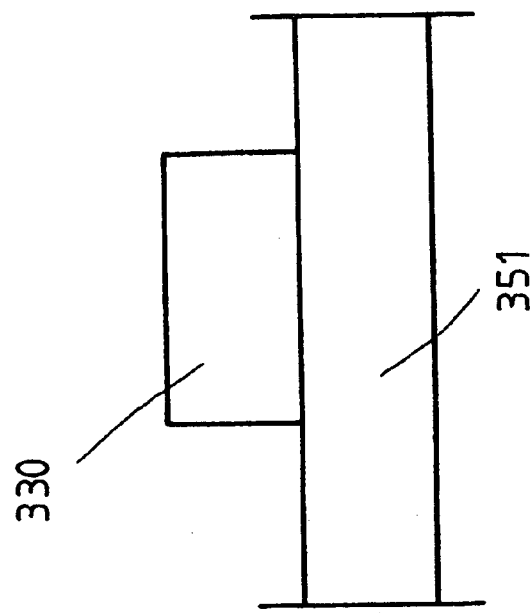
FIG. 8 shows a fifth embodiment of the present invention.

The most basic exploitation of the inventive concept of the present invention is, however, shown in FIG. 8 representing the fifth embodiment. In the fifth embodiment, a frequency converter 330 is located on a conduit portion 351 connecting a hydraulic source with a pump. The amount of heat produced in the frequency converter is transferred to the liquid flowing in conduit portion 351. Cooling of the drive motor may in this embodiment be effected in a conventional manner via surface cooling utilising a fan.

Figure 9:
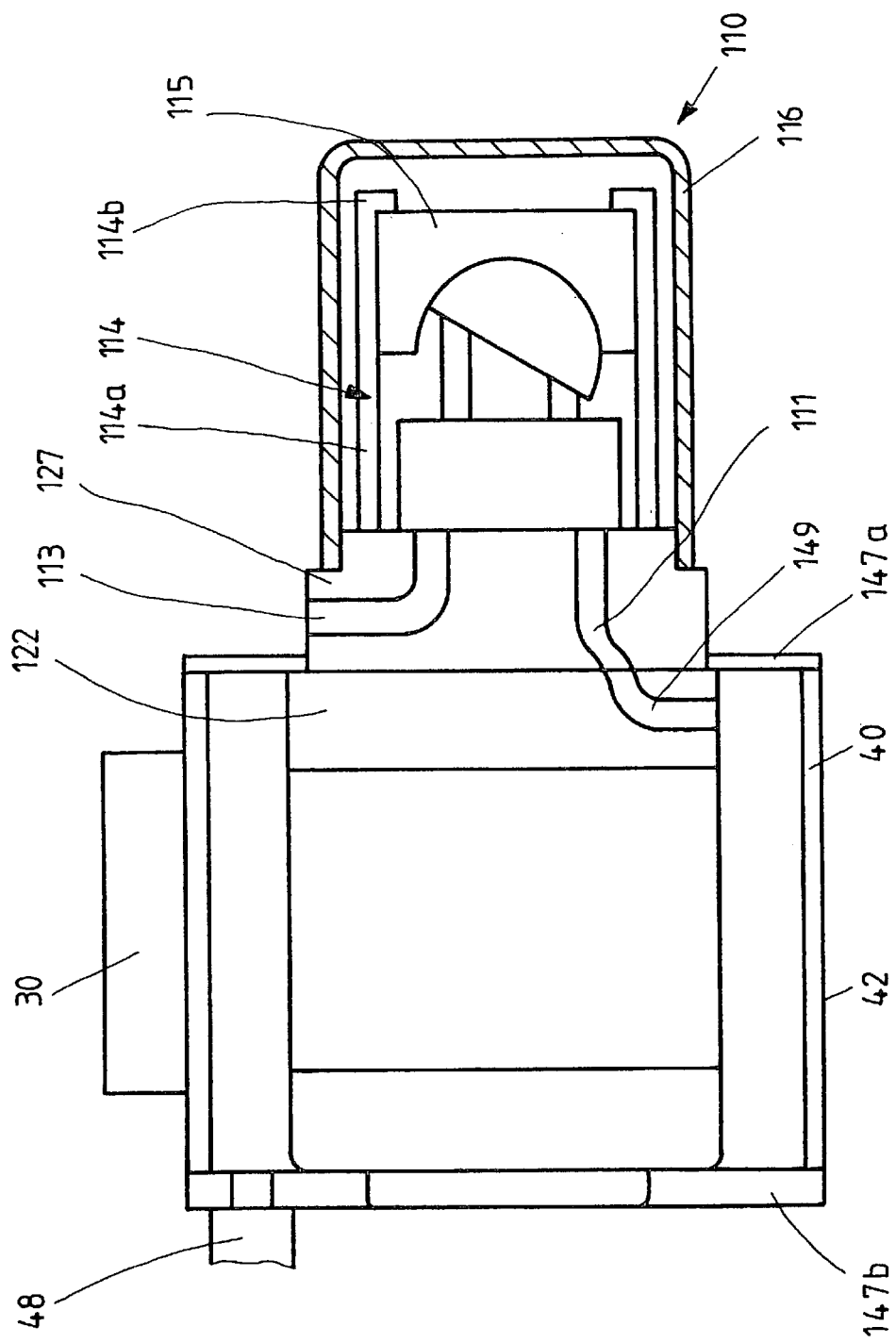
FIG. 9 shows a sixth embodiment of the present invention.

In FIG. 9, a further development of the second embodiment is shown as a sixth embodiment of the present invention. The sixth embodiment differs from the second embodiment in that an A flange 122 is provided as a front face-side lid of the drive motor, which forms the sealing cover of a pump 110 at the same time.

In such a structure, the pump 110 preferably is an axial piston pump. More precisely, the A flange 122 comprises a cyclindrical projection 127 on which components of the pump 110 are fastened. These components are, e.g., support means 114 for an adjustable or non-adjustable axial abutment 115 of the axial pistons and a housing 116. The support means 114 comprise elongated portions 114a in parallel with the axial pistons and portions 114b offset at an angle and arranged opposite the cyclindrical projection 127, which are contacted by the abutment 115 of the axial pistons.

The housing 116 ist preferably cup-shaped and encloses the support means 114 without contacting them in the position in which it is attached on the cyclindrical projection 127. Leakage oil may thus be contained by the housing 116, and noise may be attenuated. In order to improve insulation against structure-borne noise and vibrations, the housing is manufactured of mineral casting material (reaction resin forming material) which is also massively utilised in the prior art owing to its excellent shaping properties and its low weight.

Between the cyclindrical projection 127 and the housing 116, structure-borne noise insulating material (not represented) is preferably installed.

The twofold function of the A flange 122 with respect to attaching hydraulic and electrical components is, however, not the only advantage of the A flange. The hydraulic connection between the cavity of the tubular portion 42 and the axial pistons may also be achieved with the aid of the A flange 122. To this end, the outlet port 149 communicating with the suction port 111 of the pump 110 through a fluid conduit in the A flange is located in the A flange 122 in a radial direction thereof. In contrast, the outlet port 49" emerges axially in the second embodiment of FIG. 5.

The pressure port 113 of the pump 110 radially emerges from the cyclindrical projection 127, so that the pressure fluid may be supplied along short conduit lengths, and thus at lower energy losses.

In the sixth embodiment, the outlet port 149 may be offset with respect to the inlet port 48 in relation to the output shaft of the drive motor as is shown in FIG. 9, or may be arranged at any other position at the circumference of the A flange 122 depending on the desired fluid conduction in the heat dissipator 40. The position of the pressure port 113 on the outer periphery of the cyclindrical projection 127 depends on the desired location of withdrawing the pressure fluid.

Moreover the frequency converter 30 may be provided not at the heat dissipator but on a conduit leading away from the pressure port 113 of the pump 110.

The sixth embodiment thus provides a drive mechanism for a pump wherein the fluid conduits are shortened and the suction conduit towards the suction port of the pump is not visible from the outside. This enhances compactness of the overall device.

In conclusion, it may be stated that the principle of the sixth embodiment, in particular the formation of a front face-side lid for the drive motor as a sealing cover for the pump, may be combined with the particular features of the preceding embodiments.

In the first to third and fifth and sixth embodiments, structure-borne noise and vibrations of the drive motor may be insulated better if the flange lids are fabricated of a sound-insulating material such as, e.g., rubber or plastic. A plastic material preferably used is polyurethane.

The advantages of the sound-insulating material are particularly conspicuous in the sixth embodiment inasmuch as, owing to the integral formation of drive motor and pump 110, the amplitude of the vibrations generated by the drive motor is raised. Flange lids 147a, 147b of sound-insulating material thus enable low-noise operation despite a compact construction.

Thanks to the present invention in accordance with FIGS. 1 to 9 it is, however, possible to achieve a further advantage cooling conduits containing a flow of cooling water are provided in the cavity designated by reference numeral 43 in FIG. 3 and designated as conduit portion 351 in FIG. 8. This advantage resides in the fact that in a device presenting the subject matter of the present invention such as, e.g., a plastic casting machine, a separate oil cooler need not be provided.

The present invention thus relates to a drive mechanism for a pump implemented by means of a drive motor, the rotational speed and torque of which are influenced by a frequency converter. The frequency converter is arranged on a heat dissipator confining a flow of pressure liquid guided to the pump. Herein it is advantageous to also arrange the drive motor inside the said heat dissipator, for this makes it possible to perform intense forced air cooling of a pump-drive motor system without the necessity of an additional cooling liquid. The drive motor preferably has a central arrangement inside a tubular heat dissipator and is exposed to the pressure liquid over its entire circumference. Baffles or offset connecting sleeves allow for uniform flow through the entire heat dissipator.

What is claimed is:

1. A drive mechanism for a pump, including a drive motor actuated through a frequency converter for varying rotational speed and influencing torque, characterised in that said frequency converter is fastened on a heat dissipator including a cavity confining a flow of cooling liquid, said cavity being incorporated in the fluid circuit of said pump, the drive motor mounted inside the cavity and the pump being mounted outside of the heat dissipator.

2. The drive mechanism in accordance with claim 1, wherein said heat dissipator is arranged in a suction conduit from a tank to said pump.

3. The drive mechanism in accordance with claim 1, wherein said drive motor is enveloped by a flow of said cooling liquid.

4. The drive mechanism in accordance with claim 3, wherein said heat dissipator has a tubular housing, on the jacket of which said frequency converter is secured, and wherein said drive motor is arranged coaxially.

5. The drive mechanism in accordance with claim 4, wherein said heat dissipator is closed on the front face side by flange lids respectively carrying on A flange and a B flange of said drive motor, an output shaft of said drive motor extending through one of said flange lids.

6. The drive mechanism in accordance with claim 5, wherein between said flanges and a cyclindrical portion of said motor peripheral seals preventing entrance of said cooling liquid into the cavity of said drive motor are provided.

7. The drive mechanism in accordance with claim 6, wherein a cable connector for said drive motor is routed through said flange lid.

8. The drive mechanism in accordance with claim 7, wherein a fan shaft, integrally formed with said output shaft of said drive motor and provided with a fan, extends through said flange lid through which said cable connector is routed.

9. The drive mechanism in accordance with claim 5, wherein ports towards said tank and towards a suction port of said pump are formed in the two flange lids externally of the mechanical connection between each flange lid and a respective flange.

10. The drive mechanism in accordance with claim 9, wherein said ports have a staggered arrangement with respect to said output shaft of said drive motor.

11. The drive mechanism in accordance with claim 1, wherein a front face-side lid of said drive motor at the same time constitutes a sealing cover of said pump.

12. The drive mechanism in accordance with claim 11, wherein a cavity confining a flow of cooling liquid in the vicinity of said drive motor is connected to a suction port of said pump by means of a fluid conduit extending in said front face-side lid.

13. The drive mechanism in accordance with claim 11, wherein the cavity confining a flow of cooling liquid in the vicinity of said drive motor is said cavity inside said heat dissipator.

14. The drive mechanism in accordance with claim 11, wherein said pump is an axial piston pump, and an axial abutment of the axial pistons is retained by support means provided at said front face-side lid.

15. The drive mechanism in accordance with claim 14, wherein radially outside from said support means a housing comprised of sound-insulating material and fastened on said front face-side lid is provided.

16. The drive mechanism in accordance with claim 11, wherein said front face-side lid and the oppositely arranged end portion of said motor are fastened on said heat dissipator by means of flange lids.

17. The drive mechanism in accordance with claim 5, wherein said flange lids are fabricated of flexible material.

18. The drive mechanism according to claim 1, wherein said drive motor is a standard asynchronous motor.

19. The drive mechanism according to claim 2, wherein the drive motor is enveloped by a flow of the cooling air.

* * * * *